March 13, 1934.  O. BARNACK  1,951,264
SETTING FOR THE OBJECTIVE OF PHOTOGRAPHIC CAMERAS
Filed Nov. 19, 1932
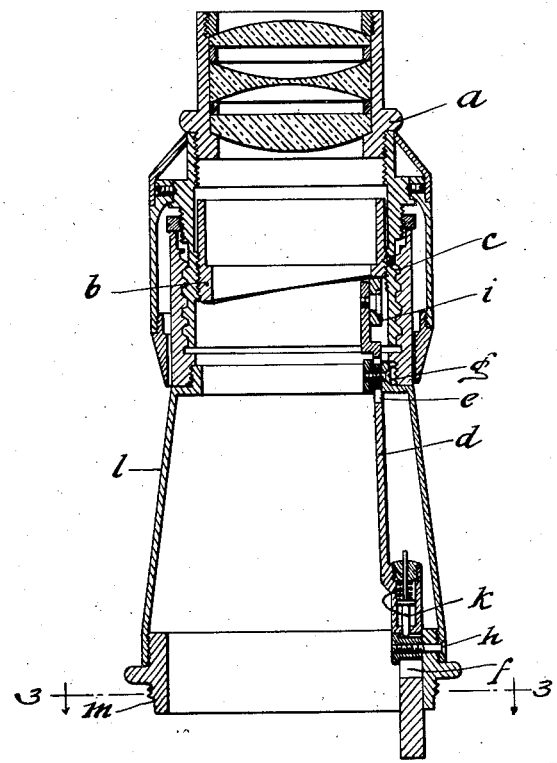
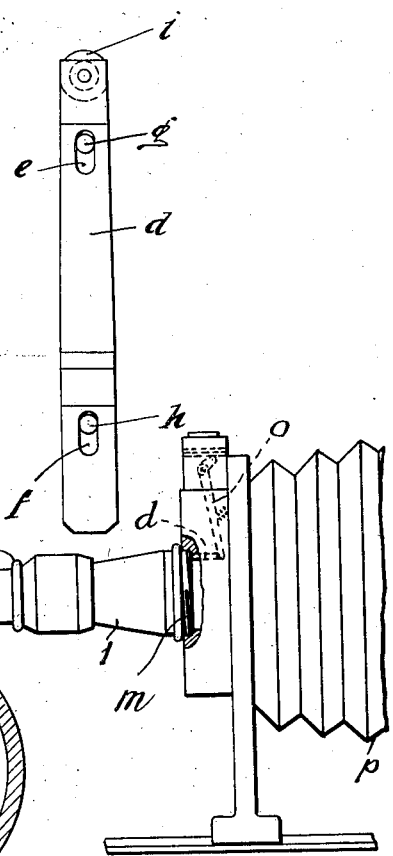
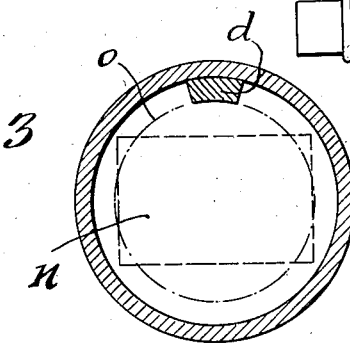
INVENTOR
Oskar Barnack
BY
ATTORNEY Patented Mar. 13, 1934

1,951,264

UNITED STATES PATENT OFFICE 1,951,264

SETTING FOR THE OBJECTIVE OF PHOTOGRAPHIC CAMERAS

Oskar Barnack, Wetzlar, Germany, assignor to Ernst Leitz, Optische Werke, G. m. b. H., Wetzlar, Germany Application November 19, 1932, Serial No. 643,323
In Germany March 15, 1932

5 Claims. (Cl. 95—44)

This invention relates to improvements in protographic objectives, particularly to a setting for such objectives which is coupled with a distance meter, and it is the principal object of my invention to provide an elastically arranged intermediary coupling member carrying at one end a glide roller engaging the inner curved face of the setting and extending with its other end through a ring into the camera in engagement with the distance meter.

Another object of my invention is the provision of a coupling between the objective setting of a photographic camera and its distance meter guided within a tubular part of the setting by slot and pin guides.

A further object of my invention is the provision of a coupling between the objective setting of photographic cameras and their distance meters having the form of a longitudinal sector of a cylinder to avoid the covering of the corners of a rectangular picture window.

A still further object of my invention is the provision of a coupling member intermediary the objective setting and the distance meter equipped with a spring member ensuring a return movement of the coupling member during the advancement of the tubular objective setting.

These and other objects and advantages of my invention will become more fully known as the description thereof proceeds and will then be more specifically defined in the appended claims.

In the accompanying drawing forming a material part of this disclosure:

Fig. 1 is a sectional elevation of a setting for a photographic camera coupled with the lever of a distance meter and constructed according to my invention.

Fig. 2 is a side elevation of a connecting member.

Fig. 3 is a cross section through the same, the section being taken on line 3—3 of Figure 1.

Fig. 4 is a fragmentary side view of a camera illustrating the lever operating the distance meter.

As illustrated the objective $a$ in its threaded setting $b$, $c$ is connected by means of a connecting member $d$ with the operating lever $o$ of a distance meter (not shown).

The connecting member $d$ in setting $b$, $c$ carries a slide roller $i$, and is guided within a tube $l$ between guide members $e$, $g$ and $f$, $h$.

The objective is adjusted in its setting either by turning it about its axis or by displacing it axially without rotary motion. The part $b$ of the setting is either curved or straight and operatively engaging the roller $i$ which will avoid friction between part $b$ of the setting and the connecting member $d$ to facilitate the operation of the latter.

The connecting member may have the form of a cylinder, but I prefer to shape it as shown in Figure 3 in section in order to avoid a covering of the corners of the picture field, as shown in Figure 3 for instance.

The ring $m$ couples the objective setting with the camera $p$.

A spring $k$ is connected with the member $d$ for returning said member during the advancing movement of the objective $a$ in its setting $b$, $c$.

In operation, the adjustment of the objective will be transmitted smoothly and without friction to the lever of the distance meter or vice versa, by the intermediary of the part of the connecting or intermediary member $d$ extending beyond the ring $m$ into the camera.

It will be understood that I have disclosed the preferred form of my device only as one example of the many possible ways to practically construct the same, and that I may make such changes in its general arrangement, and in the construction of its minor details as come within the scope of the appended claims without departure from the spirit of my invention and the principles involved.

Having thus described my invention, what I claim as new, and desire to secure by Letters Patent is:

1. A setting for the objective of photographic cameras including a distance meter and its operating lever comprising an elastically arranged connecting member between said setting and the distance meter.

2. A setting for the objective of photographic cameras including a distance meter and its operating lever comprising an intermediary member connecting said setting and distance meter, a tube having guides in which said member is guided, and a slide roller on said member adapted to be engaged by said setting.

3. In a coupling between the objective setting and the operating lever of the distance meter of photographic cameras, an intermediary connecting member slidably guided between the objective setting and the distance meter, and a spring connected with said member to return the same during the advancing movement of the objective in its setting.

4. In a coupling between the setting for photographic objectives and the operating lever of their distance meter, an intermediary member having the form of a longitudinal tube sector for coupling objective setting and distance meter avoiding the covering of the corners of a rectangular picture window by said member.

5. In a coupling between the setting of photographic objectives and the operating lever of their distance meter, a ring connecting the setting with the camera, and an intermediary connecting member carrying at one end a roller engaging the curved inner face of the tubular objective setting and extending with its other end through said ring into the camera.

OSKAR BARNACK.